United States Patent [19]

PeBenhofer

[11] Patent Number: 4,812,982
[45] Date of Patent: Mar. 14, 1989

[54] APPARATUS FOR RECOGNIZING CODE MARKS

[76] Inventor: Walter PeBenhofer, 8020 Graz, Weissenkircherstrasse 23, Graz, Austria

[21] Appl. No.: 942,343

[22] Filed: Dec. 16, 1986

[30] Foreign Application Priority Data

Dec. 16, 1985 [AT] Austria ............................ A 3627/85

[51] Int. Cl.$^4$ ...................... G06F 15/20; B65G 47/00
[52] U.S. Cl. ................................ 364/478; 250/223 R; 209/576
[58] Field of Search ................. 364/555, 478; 235/383, 235/384, 385; 209/3.3, 546, 576; 198/352, 353, 354; 250/223 R, 578

[56] References Cited

U.S. PATENT DOCUMENTS

| | | | |
|---|---|---|---|
| 3,639,728 | 2/1972 | Helfand et al. | 364/478 |
| 4,240,148 | 12/1980 | Thoma | 364/478 |
| 4,325,126 | 4/1982 | Thoma | 364/478 |
| 4,404,645 | 9/1983 | Elings et al. | 364/728 |
| 4,591,991 | 5/1986 | Sticht | 364/478 |

*Primary Examiner*—Parshotam S. Lall
*Assistant Examiner*—S. A. Melnick
*Attorney, Agent, or Firm*—Bacon & Thomas

[57] ABSTRACT

In an apparatus for recognizing the positions, adjustable in a specific number of steps, of at least two code marks, relative to a fixed third code mark the code marks are moved relative to a read station including a specific number of code readers. The code readers are connected to a multiplexer system controlled by an address counter which interrogates the code readers sequentially and emits the results serially. The multiplexer system output is connected with a buffer memory unit to store and deliver the particular results. The output of the buffer memory unit is connected to the input of a priority encoder, the output of which is fed the binary code address of the sequentially highest input indicative of the presence of a code mark at the code readers. The priority encoder outputs are fed to two end buffer memories of which the inputs are in parallel. Two counting and memory pulse generating circuits are provided which are so connected with the address counter and the end buffer memories that when the first code reader following the passage of a first code mark recognizes the passage of a second code mark, the first end buffer memory assumes the output value from the priority encoder, and when the last code reader following the passage of a first code mark recognizes the passage of a second code mark, the second end buffer memory assumes the output value from the priority encoder.

11 Claims, 6 Drawing Sheets

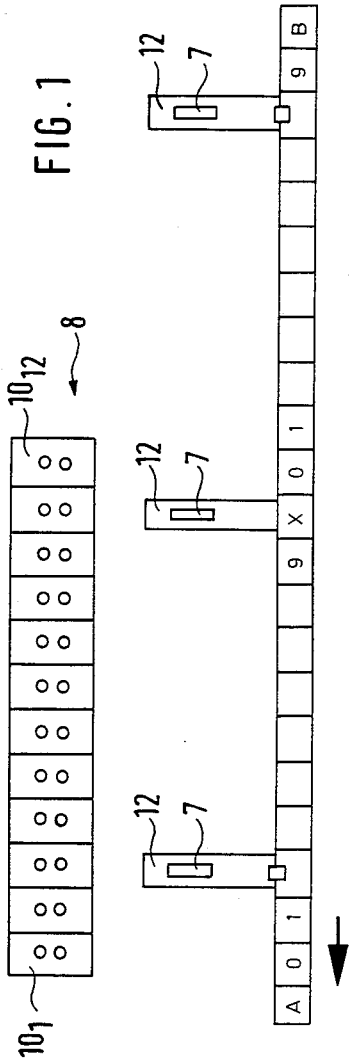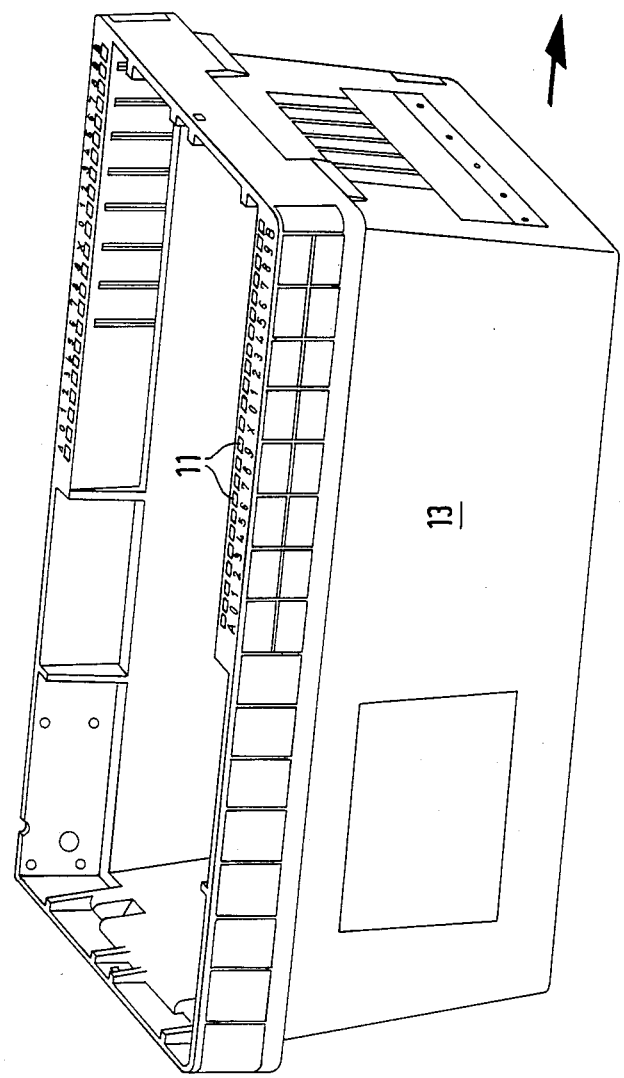

FIG. 7
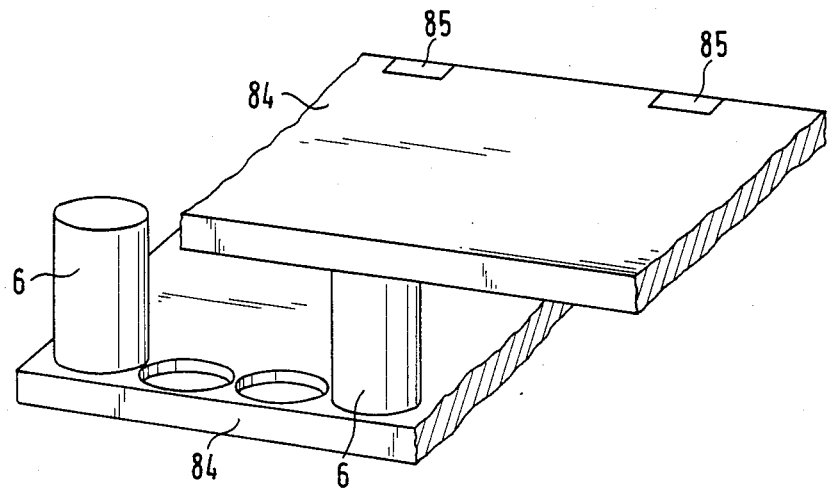
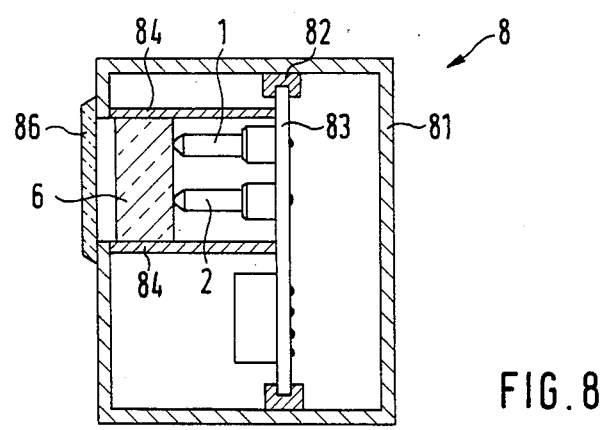
FIG. 8

APPARATUS FOR RECOGNIZING CODE MARKS

BACKGROUND OF THE INVENTION

1. Field of the Invention

The invention concerns apparatus for recognizing code marks.

2. Description of the Related Art

When controlling automated conveying or sorting processes, a problem is encountered in that individual articles conveyed on tracks that branch off must turn off at some forks but not at others. The choice of tracks and control of the switch-points at appropriate forks may take place from a central location by using a computer to monitor the path of an individual container and by corresponding actuating the particular switch-point. However, a plurality of control lines must be installed for such a purpose, whereby the cost and also the susceptibility to interference of the entire system become unacceptably high.

It is known to code mark the articles to be conveyed so that they contain data arrays providing data relating to a specific path. The code marks to that end are arrayed in discretely set, mutually relative positions. To read and then control the switch-point at each fork, read stations are mounted in front of these forks and include a specific number of code readers. The distance between the code readers is determined by the distance between the code marks. This known apparatus provides a separate code reader for every possible position of a code mark. Therefore, the number of code readers must correspond to the number of possible code mark positions, and the read station consequently is extraordinarily costly. Furthermore, the wiring together of the individual code readers is highly elaborate and further increases the cost of installation. Lastly the known apparatus suffers from a substantial problem in that all code readers must be precisely adjusted, i.e. they must be electrically matched to assure problem free operation. It is clear that such complex read stations entail high costs.

SUMMARY OF THE INVENTION

The object of the present invention is to provide for recognizing code marks which operates economically, reliably, and efficiently.

The design of the invention makes it possible to use a specific number of code readers to precisely recognize twice the number of mark positions, so that the lesser number of code readers reduces the susceptibility to interference of the overall apparatus as compared to previous systems. The recognized data are delivered digitally so that they can be easily processed by known means. A "base station" therefore can be operated in arbitrary locations and needs to be modified only with respect to analyzing the outputs, which makes economical mass production possible. Because the code readers furthermore can be interrogated by a multiplexer system, a single electronic circuit suffices to process the signals from an essentially arbitrary number of code readers.

In a preferred embodiment of the invention, the circuitry is such that only when two (and only two) code marks are in the zone of the read station will the positions of these two code marks be transferred into the final buffer memory (for later processing). As a result, the distance between code marks will not be stored unless 1.) the first code reader emits a recognition signal indicating the presence of a leading first code mark, 2.) a fixed code mark arrives the first code reader, and 3.) the first and leading code mark is recognized by another code reader. When the fixed code mark arrives, the first code reader emits a signal for the second time initiating storage of the distance between the first and fixed code marks, while the distance to the next higher code mark is not stored until the last code reader emits a signal for the second time. Thus, error is reliably prevented in the preferred embodiment. Safety from interference is provided because a single, random spurious pulse does not actuate the code reader.

The above-mentioned preferred embodiment further includes the feature wherein the operating rate of the multiplexer system is selected so much above the speed of the code marks that when these code marks move past the code readers, the code readers of the entire read station can be interrogated several times until the same result is obtained each time, indicating the absence of interference. The result obtained for instance can be averaged to increase signal redundancy. Preferably, however, the design is selected to be such that the recognized result shall be transferred only when a specific number of read processes does not deviate in the results, that is, when a code mark is recognized as present a given number of sequential times without interruption. If in a single scanning process the particular mark is not recognized, then the count process will start anew. By analyzing the code mark recognition in this manner, further and very substantial reliability against interference is achieved.

In a further feature of the preferred embodiment, a delay circuit with a defined time constant is mounted in the multiplexer system output line. A monitoring circuit is provided and so connected to the output of the delay and the final buffer memory that the final buffer memories are reset when, following a time interval exceeding the time constant, no further signal appears at the output of the delay. The monitoring circuit is turned on at the first data pulse and, over a specific time (such as 400 ms), will release all memories and counters in the circuit. If now no data pulse appears within a specific time exceeding the delay of the time delay, then the monitoring circuit resets and blocks all memories and counters. In this manner a stray data pulse (from reflection or extraneous sources when using light barriers) cannot generate a residual memory content. Also, the monitoring circuit prohibits letting one of the counters keep on counting which, in regular reading, would cause errors. Moreover, this circuit resets the memory pulse generator after its proper operation.

The apparatus of the present invention reduces interference. A preferred embodiment of the present invention has code readers that each comprise an emitter element and an associated detector element. The multiplexer systems contain two multiplexers of which the address lines are in parallel and of which the inputs are connected to the outputs of the detector elements in such a manner that, when serially interrogating the detector elements, a specific detector element is first interrogated by the second multiplexer and after a delay defined by a number of pulses is interrogated by the first multiplexer. Further, a decoder is provided with its address inputs in parallel with those of the multiplexers and with its outputs in a drive connection to the emitter elements, the circuity being such that, upon the first multiplexer interrogating the detector elements, the associated emitter elements are driven. Provision is further made that the second multiplexer is followed by a delay circuit having a delay time equal to that between the two multiplexers. Lastly, the output from the first multiplexer and that of the delay are so fed to a subtracting circuit that its output corresponds to the output of a detector element when the emitter element is actuated, less the value, as measured in advance by the amount of the time delay, of the same detector element when the emitter element is inactive.

The special design of the invention assures that external interferences (for instance extraneous light if light barriers are use) are substracted from the actual test result and thus compensated. If, as is typically true, the interference changes more slowly than the scanning of the diverse detector elements, the error redundancy of the system is enhanced substantially. Another advantage of this design is that the emitter elements never operate simultaneously; rather, they are pulse driven one after the other. As a result the apparatus is further simplified, in particular as regards the required power source to feed the emitter elements. Lastly, this arrangement provides for nulling the detector elements in the absence of external interference at the detector element.

The time delay circuit may be a conventional delay line (integrator) or also a chain of links providing accurate time shifting.

Insensitivity to interference, i.e. operational reliability, can be further enhanced while simultaneously reducing manufacturing costs by including with the read station code readers reflection light barriers with light emitters and light detectors mounted above each other perpendicular to the direction of motion of the code marks so that cylindrical lenses are mounted as close as possible to the light emitters and light detectors. As seen in the direction of motion of the code marks, all the cylindrical lenses of the individual code readers are mounted directly next to each other to form the read station. This arrangement ensures that the read station can be made with minimal bulk so that substantial reduction in material and volume is achieved. High optical efficiency is obtained by using the cylindrical lens arrangement, and advantageously, one cylindrical lens shall be simultaneously used for two elements, one for the emitter and the other for the detector. Again, further cost reduction is made possible thereby.

BRIEF DESCRIPTION OF THE DRAWINGS

FIG. 1 is a schematic of the code mark read station;

FIG. 2 is a container on which the code mark may fixed;

FIG. 7 is a partial perspective view of a read station; and

FIG. 8 is a longitudinal section view of a read station.

Figure 3:
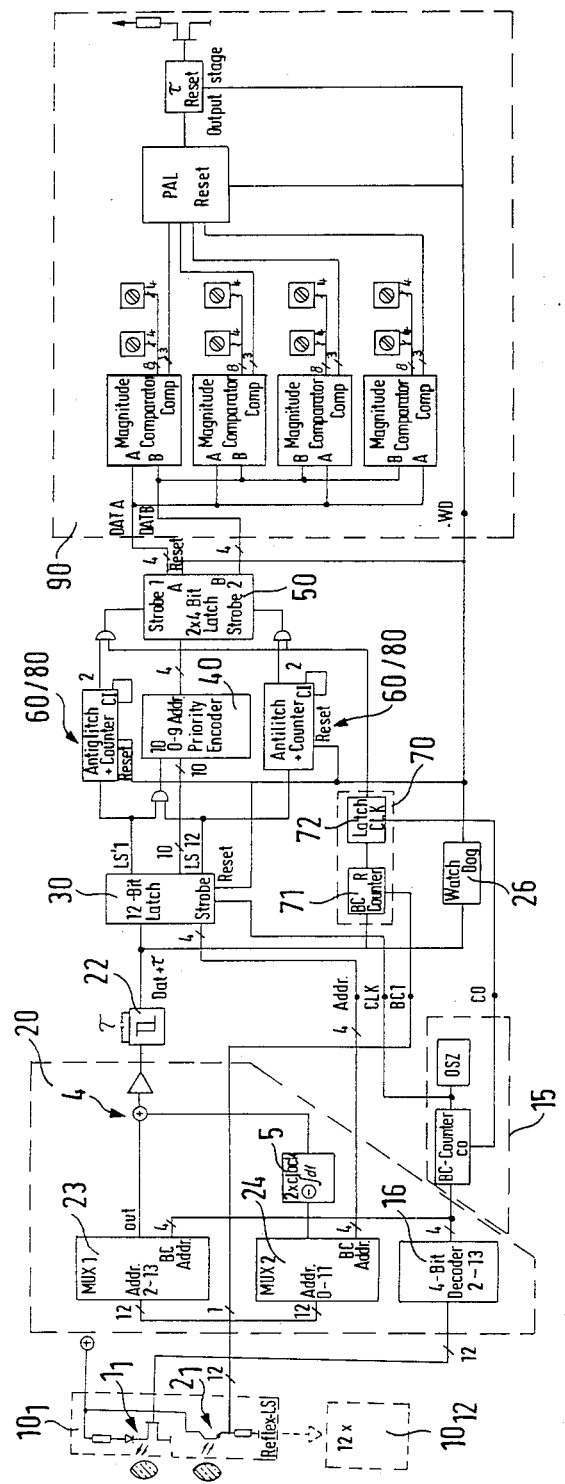
FIG. 3 is a block circuit diagram of a complete recognition circuitry.

The application of the apparatus of the invention is discussed in detail in relation to FIGS. 1 and 2.

When orders are delivered from a distributor, for instance a pharmaceutical wholesaler, one (or more) containers 13 is associated with a specific order or client (pharmacy). The container is expected to follow a specific path on the conveyor which is equipped with switch-points. This path can be determined by the code marks 12 which can be placed on the container at mark seats 11. The central one of the code marks 12 shown in FIG. 1 always is placed and left there possibly fastened in the position shown. The other two code marks 12, including tabs 12a for permitting movement of the code marks, may be placed at will between the positions 0 through 9 and A or B. Each of the code marks 12 is provided with a reflecting area 7 consisting of known reflecting foil with high directional selectivity.

A read station 8 is mounted in front of each of the path's switch points (omitted); for the sake of clarity, this station is shown in FIG. 1 above the code mark strip. The code read station 8 altogether comprises twelve code readers $10_1$–$10_{12}$ mounted next to each other, whereby the code marks 12 sequentially pass the individual code readers $10_1$–$10_{12}$. The direction of motion of the container 13 is indicated by the arrow in both FIGS. 1 and 2.

The preferred embodiment of the invention discussed here is described in greater detail below in relation to FIG. 3.

As shown by FIG. 3, the apparatus comprises first the code readers 10 (only one of which is shown in FIG. 1) each consisting of an emitter element 1, a FET controlled LED, and a detector element 2 such as a phototransistor. The system of emitting and detecting pairs (in this case a total of 12) is driven by a multiplexer system which consists of a first multiplexer 13, a second multiplexer 24 and a decoder 16, all of which are connected by their address inputs so the outputs of a (BC) counter 15. The two multiplexers and the decoder 16 therefore are simultaneously switched by the counter 15.

The first multiplexer 23 is connected by its input No. 2 to the first detector element ($2_1$) which simultaneously is also connected to the second multiplexer 24 by its input No. 0. The decoder 16 is connected by its output No. 2 to the associated first emitter element $1_1$. The further emitter elements $1_n$ and detector elements $2_n$ are connected to the corresponding outputs of the two multiplexers 23 and 24 and of the decoder 16 in such a manner that during the timing of the multiplexers or of the decoder by counter 15, the second multiplexer 24 is always coupled two pulse intervals ahead of the first multiplexer 23 or the decoder 16 to the corresponding code reader $10_1$ or its detector element $2_1$.

The output of the second multiplexer 24 is fed to delay circuit 5. Delay circuit 5 shifts the output signal of the multiplexer 24 by an amount corresponding to the aforesaid output differences between the multiplexer 23 and the multiplexer 24. The (inverted) signal from the delay 5 therefore always represents the output signal from the same detector element $1_n$ as the output signal from the first multiplexer 23. These signals from the same detector elements $1_1$ are summed in the circuit denoted by 4, that is, due to the sign reversal in the delay 5, the outputs of the detector elements $2_n$ are subtracted from each other. As already explained initially, environmental interference, for instance spurious light, is eliminated thereby. Accordingly, a signal trail free from interference departs from the multiplexer circuit 20, representing the sequentially "read-out" values of the code readers $10_n$. These outputs are delayed for a time in a further delay circuit 22 and are stored in a buffer storage 30. The current storage time is controlled by a connection between the memory 30 (strobe input) and the clock output of counter 15. Due to the delay 22, the actual data pulse therefore always is reliably located within the storing interval.

The memory address also is controlled by the counter 15 (parallel with the multiplexer circuit 20). Moreover a monitoring circuit 26 is provided which is connected to the output of the delay 22 and which always drives or resets the memory 30 when specific conditions, elucidated further below, are present or absent.

By means of the outputs LS1 and LS12 corresponding to the first code reader $10_1$ or $10_{12}$ the memory 30 feeds a protective circuit 80 in each case to drive a count and a memory pulse circuit 60. Both circuits are explained further below. These two outputs of the memory 30 furthermore are connected to an AND gate of which the output is fed to the input No. 10 of a priority encoder 40.

The remaining outputs of the memory 30 (LN2–LS11) are applied to the inputs No. 0–9 of the priority encoder 40.

The (four) outputs from the priority encoder 40 are fed to the inputs of an end buffer storage 50 with two strobe inputs corresponding to its internal division into two. The strobe inputs are connected to the outputs of AND gates of which the inputs on one hand are connected to the outputs of the count and pulse generator 60 and on the other hand to the output of a code mark number recognizing circuit 70. The circuit 70 recognizing the number of code marks includes a counter 71 with subsequent latch memory 72 driven by the carry-out (CO) signal from the counter 15, while the counter 71 is connected by its count input to the ouput of the delay 22 and by its reset input to the output of the first detector element $2_1$.

The outputs of the end buffer memory 50 are connected to the inputs of a comparator 90 comparing the read positions of the code marks with prestored values and generating corresponding output signals to drive the switch-points.

The input portion of the circuit is discussed in further detail below in relation to FIG. 4. The positions of the multiplexers 23, 24 and of the decoder 16 will not be discussed again. The delay circuit 5 consists of an operational amplifier of which the positive input is grounded. The output of the multiplexer 24 is connected by a resistance $R_{22}$ to the inverting input of the operational amplifier which is fed back through a capacitor $C_{13}$. Furthermore a resistance $R_{14}$ is inserted in the feedback loop to limit the maximum amplification of the delay circuit 5.

The subtraction circuit 4 actually is designed as an adding circuit but acts in subtracting manner because the delay 5 inverts its input signal. The "subtracting circuit" 4 therefore is a conventional negative feedback inverting amplifier.

The subtraction circuit 4 is followed by an amplifier shifting the level of the input signal and matching it to the subsequent digital circuitry. This circuit following the subtractor 4 also is connected through a diode and resistance in series to ground, the connection between diode and resistance being fed back to the delay 22 consisting of two series digital inverters between which is mounted a first order low pass filter.

Figure 4:
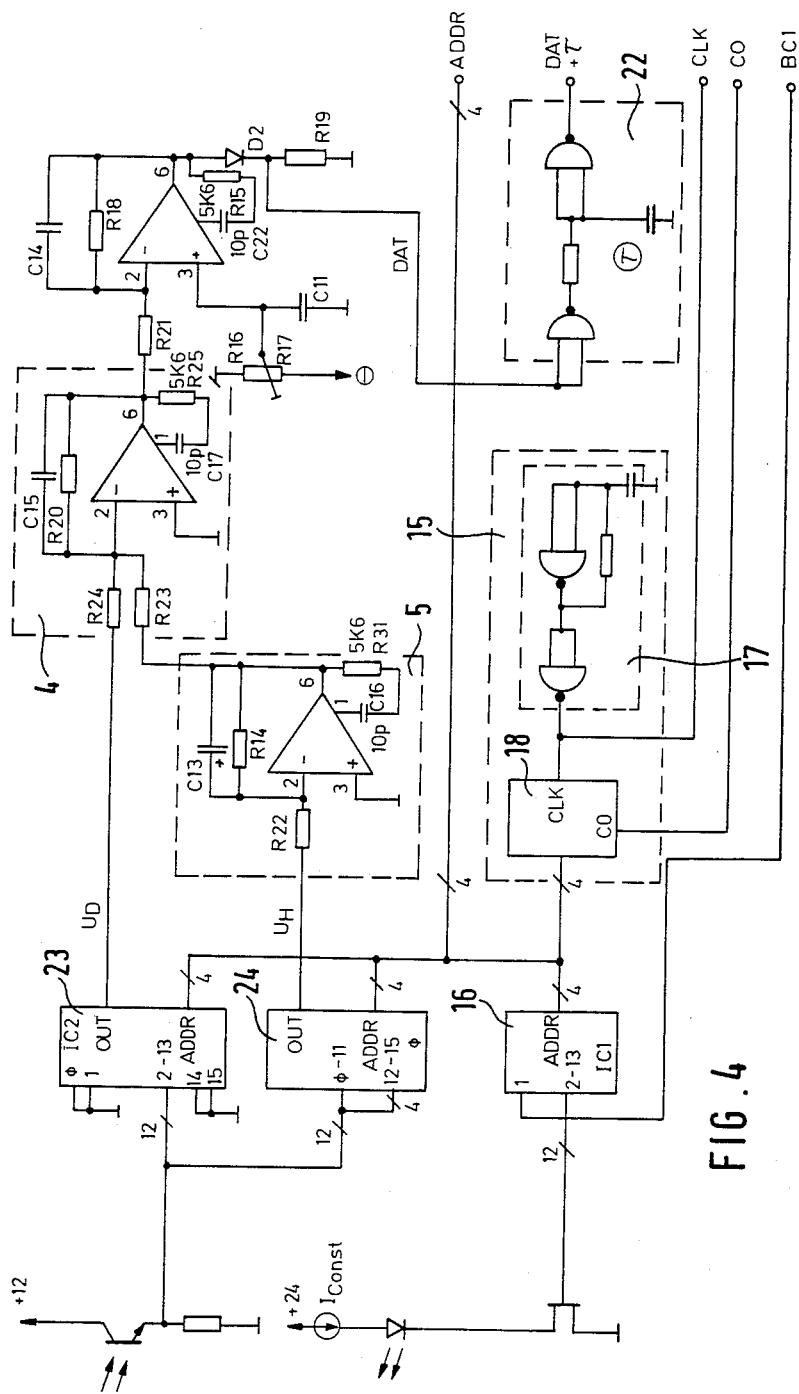
FIG. 4 is a circuit diagram of the input portions of the circuitry of FIG. 3.

The address counter 15 consists, as shown in FIG. 4, of an oscillator 17 in the form of a feedback inverter with subsequent buffer and damping by a capacitor. The oscillator 17 controls a binary counter 18. After completely counting up in the counter 18, a carry-out (CO) signal is emitted each time.

The memory portion of the circuitry is discussed in closer detail below in relation to FIG. 5.

Figure 5:
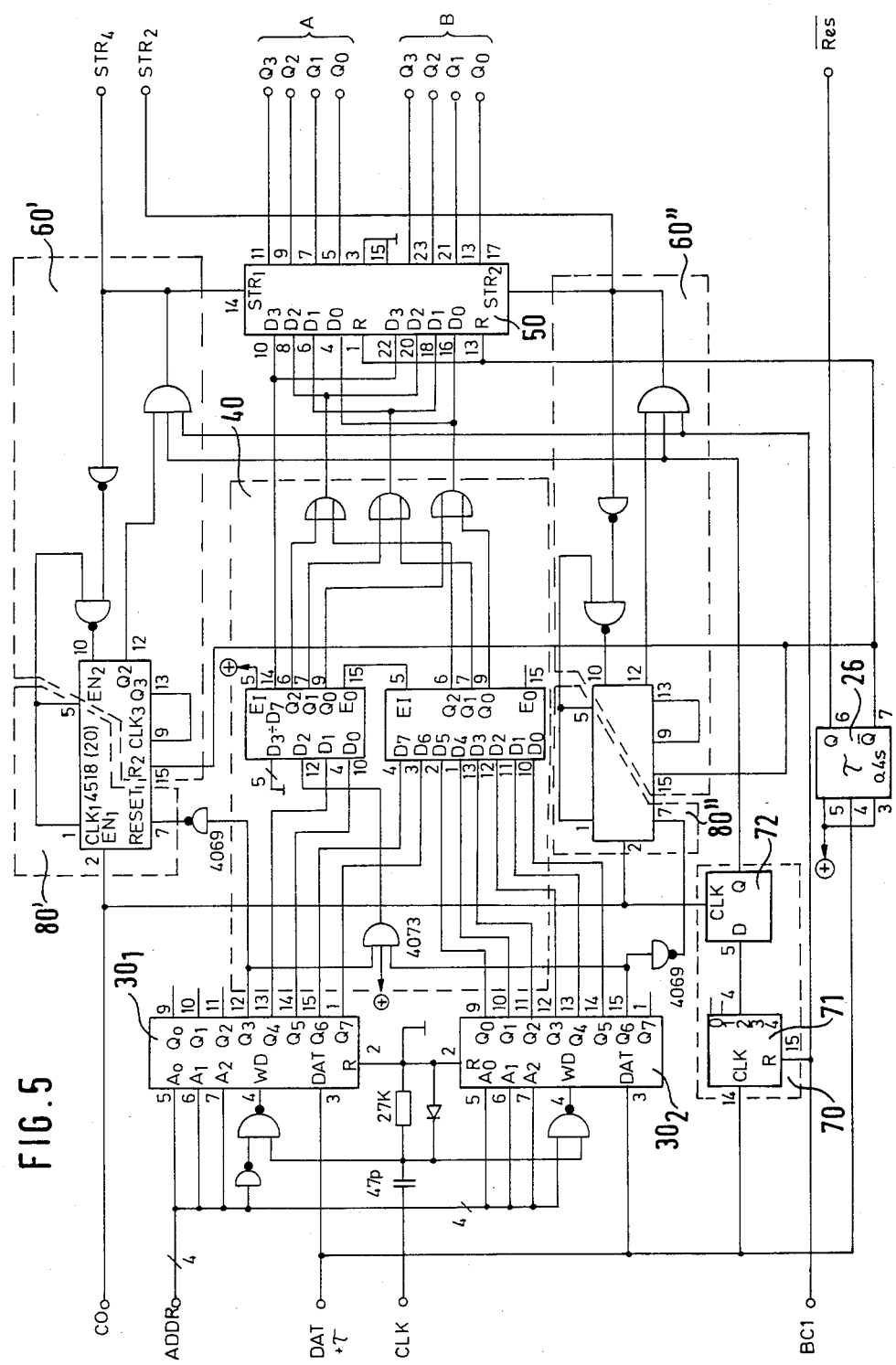
FIG. 5 shows the circuit for the memory portion of FIG. 3.

As shown by FIG. 5, the first memory 30 consists of two storage components $30_1$ and $30_2$ forming twelve addressable buffer storages (one for each code reader). The address conductors are parallel with those of the multiplexers. Because the data through the delay 22 are time shifted by half a clock cycle, the short clock pulse defining the storage instant is located centrally in the data window. The data, however, is located higher in the buffer memory by by an amount equal to one address value. Therefore, the outputs are used in correspondingly shifted form, beginning at $Q_3$.

The two protective circuits 80' and 80" are symmetrical and identical. Each consists of a counter the clock pulse of which is fed to the CO of the address counter 15, which in this instance is the enable input, because clock and enable can be interchanged depending on the required polarity of the pulse sides. The reset inputs are connected to the data conductors. An essentially freely selectable counter output $Q_n$ furthermore is connected to the clock input of the counter. It is noted in this respect that FIG. 5 shows a circuit using a component containing two counters.

As long as a low voltage is applied to the reset input, that is, as long as the corresponding code reader receives no signal, the counter remains in the reset state. If now the data conductor, i.e. the reset input, is raised to a high potential (namely, a code mark is in front of the corresponding code reader), then the next CO pulse can advance the counter by one step. As mentioned above, the CO pulse occurs after the scanning cycle has been completed, that is, after all the code readers $10_1$–$10_{12}$ have been scanned. Therefore the counter after n scanning cycles arrives at the preselected count value n at which the output $Q_n$ rises to the high voltage. If now during the count up, however, the particular first or last code reader were to emit no signal, then the counter 80' or 80" would be reset and counting would start again. The counter therefore can reach its final value only when the data conductor remains at high potential for at least n scanning cycles. Any light "bouncing" is thereby eliminated.

The preselected output $Q_n$ of the counter 80' or 80" is connected to the clock input of the particular counter. Once reached, the count n is reatined thereby until the data conductor again is at a low voltage.

The design and the function of the counting and memory pulse circuit 60 are discussed in more detail below. It must be borne in mind that three code marks are provided which can be each removed from the other (or two of them with respect to the central one) by as many as eleven places. Because the read station 8 only has twelve code readers 10, the two distances or differences in position between the three code marks must be scanned and stored independently of each other.

To distinguish from one another the two distances, two counters in the circuits 60', 60" each count only the bright phases of the first or last code readers $10_1$ and $10_{12}$, respectively, as seen in the direction of advance. If a mark is present for the second time at the first code reader $10_1$, i.e. if an output signal appears for the second time at this code reader, then the counter of circuit 60' counts to 2. In this case there are precisely two code marks in front of the read station 8. To eliminate any interference, a code mark notation recognition circuit 70 is further provided, which will be discussed in more detail below. Under these conditions therefore the apparatus deals with the first distance between code marks as seen in the direction of advance of the container 13.

If now a signal appears for the second time at the output of the last code reader $10_{12}$, then the first code mark already must have left the read station 8, in which case, if only two code marks are before the read station 8 (see circuit 70 discussed below), then the second distance between the code mark is involved.

In both of the above cases, a high voltage appears at the output $Q_2$ of the counter of the circuits 60' or 60", whereby the storage pulse for the corresponding code mark distance is derived under conditions discussed further below.

The first of these further conditions is that only two code marks may be before the read station. The second additional condition which must be present for storing in the memory 50 is the presence of the BC1 pulse from the address counter 15. Because the condition determined in the circuit 70 is assumed by the CO pulse, the BC1 pulse will be adequately late.

A further count pulse is fed through gates in the circuit 60' or 60" simultaneously with the storage pulse for the memory 50 to the count input of the circuit 60' or 60", whereby the counter keeps counting and its output $Q_3$ is raised to a high voltage. However, this output is connected to the counter clock input and therefore the count is retained until the counter is reset through the reset input. This reset operation takes place by means of the output pulse from the protective circuit 26 described in further detail below.

Only a single storage pulse is allowed by the particular connection of the output $Q_3$.

The above description covers the case wherein two separate Johnson counters are used in the circuits 60 and 80. As already explained, the circuit shown in FIG. 5 uses components each containing two binary counters. Accordingly two directly sequential storage pulses occur, because the second output $Q_2$ in the binary counter for a count of 3 also is at high potential for the count of 4. However the proper functioning of this circuitry remains unaffected.

The above condition that two code marks be before the read station 8 is required to eliminate mechanical tolerances. If for instance the first code reader $10_1$ recognized the central code mark (i.e., if a code mark were before the code reader a second time) before the first code mark were in a proper recognizable position in front of the particular code reader $10_n$, then an erroneous interpretation of distance "O" would be stored. This erroneous interpretation is prevented by the circuit 70.

The circuit 70 includes a counter 71 counting the number of recognition signals within a single scanning cycle. After each scanning cycle, that is after all the code readers $10_1$–$10_{12}$ have been scanned once, the counter 71 is reset. Before being reset, the count—if the counter counted to 2—will be stored in a D latch 72. The CO signal is the stored pulse. However to separate in time the rest pulse from the stored pulse, the circuit 70 will be reset only with the output pulse BC1 from the address counter 15. In this manner the reset procedure and the storing procedure are kept apart by two clock cycles.

A high potential will be present at the output Q of the D latch only when the circuit 70 has counted to 2 by the end of a scanning cycle.

The operation of the monitoring circuit 26 is discussed in closer detail below. Essentially, a monostable multivibrator (monoflop) 26 with a time constant $\tau$ is used to reset all counters and memories.

At the first data pulse, the monoflop 26 is triggered for the time interval $\tau$ (about 400 ms) and it unlocks all memories and counters in the circuit. If now over a time interval exceeding $\tau$ no further data pulse occurs, the monoflop 26 resents and thereby also resets all memories and counters. Thereby no stray data pulse (for instance by reflection or from extraneous light leaks etc.) can generate a retained memory content, and no counter can go on counting, which in conventional scanning would result in errors.

Also, the circuit 26 resets the counting and storing circuits 60', 60" after they have operated properly.

The operation of the priority encoder is discussed in closer detail below.

As is known, a priority encoder's output is the binary coded address of the highest value input fed by "1". In the preferred embodiment of the invention shown in FIG. 5, two such circuits are used making it possible to code up to 16 inputs into a 4 bit output address.

The inputs are serially located at the outputs of the memories $30_1/30_2$, the first and the last memory output (corresponding to the first $C_1$ and to the last $C_{12}$ code readers) are connected together through an AND gate to the input "10" of the priority encoder 40. When a code mark is located in position A (FIG. 1) or B, the distance to the fixed (central) code mark will be eleven spaces, that is, the first code reader $10_1$ and the last code reader $10_{12}$ simultaneously receive a signal.

Figure 6:
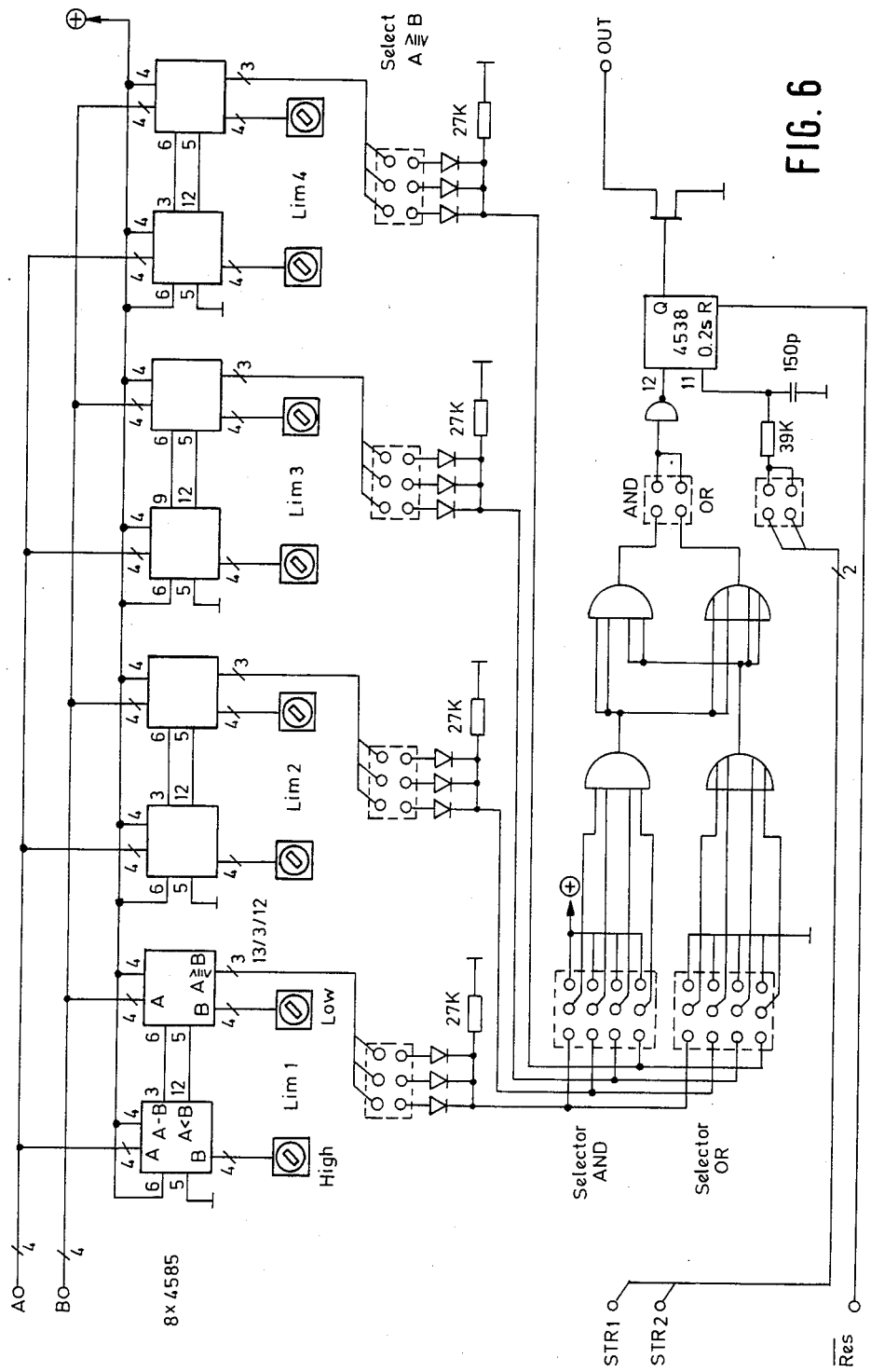
FIG. 6 shows the circuit of the analyzing portion of FIG. 3.

For the sake of completeness, the diagram of an analyzing circuit is shown in FIG. 6. Closer discussion is not required as the operation of the circuit is obvious to the artisan of ordinary skill in relation to the components shown in FIG. 6.

A preferred embodiment of a read station 8 is discussed in further detail below in relation to FIGS. 7 and 8 as regards its mechanical nature. As shown by the section of FIG. 8, the read station 8 includes a housing 81 in which a base plate 83 is mounted in rails 82. The pairs of light diodes 1 and phototransistors 2 are mounted above each other on the base plate 83. Also, cylindrical lenses 6 are mounted in front of the light diodes 1 and phototransistors 2 and are kept in place by their plane ends by retaining brackets 84. The retaining brackets 84 consist of laminations so that the printed circit strips 85 are not etched off. The retaining brackets 84 are soldered through these strips 85 to the board 83. An anti-soiling window 86 is located in front of the cylindrical lenses 6.

As shown by the description of FIGS. 7 and 8, an especially compact and nevertheless economical design is thereby made possible. This compactness facilitates handling the apparatus, for instance when installing it at its site of operation. Furthermore the use of the cylindrical lenses and their linear refraction achieves increases safety against interference when reading the code marks or the reflecting zones 7 because changes in height do not entail significant interference.

The principles, preferred embodiments and modes of operation of the present invention have been described in the foregoing specification. The invention which is intended to be protected herein should not, however, be construed as limited to the particular forms described, as these are to be regarded as illustrative rather than restrictive. Variations and changes may be made by those skilled in the art without departing from the spirit of the invention. Accordingly, the foregoing detailed description should be considered exemplary in nature and not as limiting to the scope and spirit of the invention set forth in the appended claims.

I claim:

1. An apparatus for recognizing a position of an article having a plurality of code marks by determining the relative positions of the code marks in respect to each other, comprising:

means for adjusting positions of said code marks such that the code marks are spaced a plurality of discrete distance increments from each other;

a read station including at least first and second code readers for recognizing positions of at least two of said code marks relative to a third of said code marks, said first and second code readers being spaced at a distance corresponding to a plurality of said discrete distance increments, each of said code readers generating output signals, and wherein said output signals include first signals indicative of the presence of a code mark at a code reader and second signals indicative of the absence of a code mark at a code reader:

an address counter;

a multiplexer system controlled by said address counter to sequentially interrogate said code readers and serially obtain said output signals of said code readers;

a buffer memory connected to an output of said multiplexer system to store said output signals at addresses corresponding to the positions of the code readers;

a priority encoder connected to an output of said buffer memory, said priority encoder generating output signals corresponding to an address of the serially highest of said first signals indicative of the presence of a code mark;

first and second end buffer memories connected to the output of said priority encoder, said end buffer memories having parallel inputs;

wherein said first and second end buffer memories are controlled by first and second pulse generators so that the first end buffer memory receives said priority encoder output signals in response to output by said first code reader of said first signal indicative of the presence of a code mark at said first code reader, and so that the second end buffer memory receives the priority encoder output signals in response to output by said first and second code readers of subsequent first signals indicative of the presence of a code mark at said second code reader, whereby the priority encoder output signals received by said second end buffer memory in response to the subsequent first signal indicative of the presence of a code mark at said second code reader correspond to the relative positions of the code marks.

2. An apparatus as claimed in claim 1, wherein:

said code readers comprise an emitter element and an associated detector element;

said multiplexer system comprises first and second multiplexers having parallel address conductors connected to the outputs of said detector elements of said code readers so as to sequentially interrogate said detectors after a time delay;

said first and second multiplexers include a decoder having address inputs parallel to the outputs of said multiplexers and outputs to drive said emitter elements so that, as said first multiplexer interrogates said detector elements, associated emitter elements are driven and the second multiplexer is followed by a delay circuit connected to the output of said second multiplexer to introduce a delay time between the output signals of the first and second multiplexers;

a subtractor to receive the output signals of said first multiplexer and said delay circuit so that said subtractor outputs a signal corresponding to the value of an emitter element less the value, measured at a lead time, of the same detector element for an emitter element that is not driven.

3. An apparatus as claimed in claim 1, further comprising means for generating an output signal only when two code marks are present at said read station; and AND gates connected to receive the output of said output signal generating means and to supply an input to said first and second pulse generators.

4. The apparatus as claimed in claim 3, wherein said AND gate also receives a second sequential output of said address counter.

5. An apparatus as claimed in claim 3, wherein said means for generating an output signal further comprises:

a counter connected to the output of said multiplexer system to count switching transactions in a single multiplexer scanning cycle during which the multiplexer interrogates each of the code readers; and a counter buffer memory connected to said counter and to an output of said address counter so as to be reset if an output from said counter corresponds to the output from said address counter, wherein said switching transactions correspond to outputs by said code readers which are indicative of the presence of a code mark at the corresponding code reader.

6. An apparatus as defined in claim 5, wherein:

housings for said code readers of said read station comprise reflecting light barriers having perpendicularly mounted light emitters and light detectors;

said code reader housings further comprising cylindrical lenses mounted as close as possible to the said light emitters and light detectors and aligned along a direction of advancement of said code marks, said cylindrical lenses mounted directly next to each other to form said read station.

7. An apparatus as claimed in claim 3, wherein said multiplexer system interrogates each code reader several times while a particular code mark moves past each code reader.

8. An apparatus as claimed in claim 7, further comprising a protective circuit for generating an output signal to release said pulse generators circuits in response to at least one of said code readers recognizing a code mark over a plurality of interrogation cycles.

9. An apparatus as claimed in claim 8, wherein said code readers are capable of generating reset pulses, and wherein said protective circuit comprises first and second counters having means for, during each interrogation cycle, counting up to a predetermined level determined by said address counter and being frozen in this state until receipt of a reset pulse generated by either said first or second code reader.

10. An apparatus as claimed in claim 8, further comprising:
a delay circuit connected to the output of said multiplexer system, said delay circuit having a fixed time constant;
a monitoring circuit connected to the output of said delay circuit for supplying a signal to said end buffer memories so that said end buffer memories are reset after a time interval exceeding said time constant.

11. An apparatus as claimed in claim 10, wherein said monitoring circuit comprises a retriggering monostable multivibrator.

* * * * *